(12) United States Patent
Charlaix et al.

(10) Patent No.: US 10,999,517 B2
(45) Date of Patent: May 4, 2021

(54) METHOD AND AIRCRAFT FOR CAPTURING AERIAL IMAGES AND THREE-DIMENSIONAL MAPPING OF A GEOGRAPHICAL AREA

(71) Applicant: SENSEFLY S.A., Cheseaux-sur-Lausanne (CH)

(72) Inventors: Jean-Christophe Charlaix, Cheseaux-sur-Lausanne (CH); Baptiste Mazin, Chardonne (CH); Alexandre Bontemps, Gex (FR); Sébastien Courroux, Montet Glane (CH); Raphael Zaugg, Lausanne (CH); François Gervaix, Lausanne (CH)

(73) Assignee: SENSEFLY S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 16/559,411

(22) Filed: Sep. 3, 2019

(65) Prior Publication Data
US 2020/0077028 A1  Mar. 5, 2020

(30) Foreign Application Priority Data

Sep. 4, 2018 (EP) .................................. 18306166

(51) Int. Cl.
| | |
|---|---|
| *H04N 5/232* | (2006.01) |
| *H04N 5/225* | (2006.01) |
| *G06T 17/05* | (2011.01) |
| *B64D 47/08* | (2006.01) |
| *B64C 39/02* | (2006.01) |

(52) U.S. Cl.
CPC ....... *H04N 5/23299* (2018.08); *B64C 39/024* (2013.01); *B64D 47/08* (2013.01); *G06T 17/05* (2013.01); *H04N 5/2253* (2013.01); *B64C 2201/123* (2013.01)

(58) Field of Classification Search
None
See application file for complete search history.

(56) References Cited

U.S. PATENT DOCUMENTS

| | | | |
|---|---|---|---|
| 6,477,326 B1 | 11/2002 | Partynski et al. | |
| 8,687,062 B1 * | 4/2014 | Reece ................. | G05D 1/0094 248/323 |

(Continued)

OTHER PUBLICATIONS

European Search Report for Application No. EP18306166, dated Feb. 22, 2019 in 7 pages.

*Primary Examiner* — Edemio Navas, Jr.
(74) *Attorney, Agent, or Firm* — Knobbe, Martens, Olson & Bear, LLP (57) ABSTRACT

A method for capturing aerial images is carried out using a geographical area using a self-piloted aircraft according to a predetermined flight plan and an image capture apparatus mounted on the aircraft while being movable relative to the aircraft around a rotation axis. The method includes capturing a first series of images during a single flyover of the geographical area by the aircraft by positioning the image capture apparatus iteratively according to a first sequence of angular position(s), and then capturing a second series of images by positioning the image capture apparatus iteratively according to a second sequence of angular position(s) including at least one angular position distinct from each angular position of the first sequence.

18 Claims, 3 Drawing Sheets

(56) References Cited

U.S. PATENT DOCUMENTS

| | | | |
|---|---|---|---|
| 9,501,820 B2 * | 11/2016 | Nissen | G06T 7/0004 |
| 2014/0267590 A1 * | 9/2014 | McClatchie | H04N 5/332 |
| | | | 348/36 |
| 2014/0300736 A1 | 10/2014 | Reitinger et al. | |
| 2016/0144977 A1 * | 5/2016 | Way | H04N 5/33 |
| | | | 348/38 |
| 2016/0229555 A1 | 8/2016 | Millin et al. | |
| 2018/0266887 A1 * | 9/2018 | Frank | H02S 50/15 |
| 2020/0116128 A1 * | 4/2020 | Pedersen | F03D 7/0296 |

\* cited by examiner

«METHOD AND AIRCRAFT FOR CAPTURING AERIAL IMAGES AND THREE-DIMENSIONAL MAPPING OF A GEOGRAPHICAL AREA»

TECHNICAL FIELD

The present invention relates to the field of capturing aerial images of a geographical area using a self-piloted aircraft, for example to calculate a three-dimensional map of the geographical area.

BACKGROUND

It is possible to capture aerial images of a geographical area using at least one image capture apparatus on board a self-piloted fixed-wing aircraft to establish a three-dimensional map of the geographical area.

To capture aerial images, the fixed-wing aircraft flies over the geographical area along straight flight lines while taking aerial images of the geographical area. The aircraft for example follows a flight plan made up of separate parallel straight flight lines, while performing half-turns between the flight lines, so as to cover the entire geographical area.

It is possible to arrange an image capture apparatus on the fixed-wing aircraft oriented such that the optical axis of the image capture apparatus is oriented substantially vertically downward when the aircraft flies in a straight line and substantially horizontally (nadir orientation). However, the captured images contain little data on the inclined or vertical surfaces of the geographical area, and the three-dimensional reconstruction of the geographical area is not very precise. This can prove problematic in particular for geographical areas located in towns or having pronounced reliefs, such as a mountainous area, for example.

It is possible to arrange one or several image capture apparatuses on the fixed-wing aircraft, each image capture apparatus having an oblique orientation of its optical axis, i.e., inclined relative to the vertical and the horizontal. Such images make it possible to obtain information regarding vertical surfaces of the geographical area.

It is also possible to take images with an image capture apparatus mounted on the aircraft with a nadir orientation and further with one or several image capture apparatuses with oblique orientations, and to combine these images for a three-dimensional reconstruction.

U.S. Pat. No. 8,687,062B1 and US2014/0267590A1 each disclose the capture of aerial images with one of the image capture apparatuses with oblique orientations, optionally combined with an image capture apparatus with a nadir orientation.

SUMMARY OF THE INVENTION

One of the aims of the invention is to propose a method for capturing aerial images of a geographical area that is easy to implement while making it possible to perform a precise three-dimensional reconstruction.

To that end, the invention proposes a method for capturing aerial images of a geographical area using a self-piloted aircraft according to a predetermined flight plan and an image capture apparatus mounted on the aircraft while being movable relative to the aircraft around a rotation axis, the method comprising, during a single flyover of the geographical area by the aircraft:

capturing a first series of images by positioning the image capture apparatus iteratively according to a first sequence of angular position(s) including a first angular position or at least two distinct angular positions, a respective image being captured for each angular position of the first sequence upon each iteration of the sequence; then capturing a second series of images by positioning the image capture apparatus iteratively according to a second sequence of angular position(s) including a first angular position or at least two distinct angular positions, a respective image being captured for each angular position of the second sequence upon each iteration of the sequence, the second sequence including at least one angular position distinct from each angular position of the first sequence.

The capture during a same flyover of the geographical area of a first series of images and a second series of images by positioning the image capture apparatus according to a first sequence and a second sequence of angular positions containing distinct angular positions makes it possible to adapt the orientation of the image capture apparatus during the flyover of the geographical area based on the relief of the geographical zone.

The change of sequence of angular position(s) of the image capture apparatus is for example determined before the flight based on the relief of the geographical area or determined during the flight based on the relief of the geographical area and/or images already captured.

The change of sequence of angular position(s) of the image capture apparatus for example consists of going from a sequence with a single angular position (i.e., a fixed angular position) to another sequence with a single angular position or to a sequence with at least two distinct angular positions, or going from a sequence with at least two distinct angular positions to a sequence with a single angular position or to another sequence with at least two distinct angular positions.

The adaptation of the angular position of the image capture apparatus based on the relief makes it possible to optimize the precision of the three-dimensional reconstruction by limiting the number of captured images.

According to specific embodiments, the method may comprise one or more of the following optional features, considered alone or according to any technically possible combination(s):

the aircraft is a fixed-wing aircraft;

the rotation angle is contained in a plane defined by the yaw axis and the roll axis of the aircraft, the rotation angle defining an angle smaller than 15° with the roll axis;

the first series of images and the second series of images are captured during the flight of the aircraft along a same straight flight line of the flight plan;

the first series of images and the second series of images are captured during the flight of the aircraft along two distinct straight flight lines of the flight plan;

the first sequence is predetermined before the flight;

the second sequence is predetermined before the flight;

the second sequence is determined during the flight;

the second sequence is communicated to the aircraft during the flight, for example from a remote command station of the aircraft;

which first sequence comprises a centered angular position in which an optical axis of the image capture apparatus is located in the plane defined by the yaw axis and the roll axis and/or at least one oblique angular position in which the optical axis is located in an oblique plane forming a non-nil angle with the plane by the yaw axis and the roll axis, and/or in which the second sequence comprises the centered angular position and/or at least one oblique angular position;

the method comprises measuring the absolute orientation of the image capture apparatus for each captured image, preferably using an inertial unit mounted on the image capture apparatus;

the method comprises measuring the geographical position of the image capture apparatus for each captured image, for example using a geolocation receiver on board the aircraft.

The invention also relates to a method for three-dimensional mapping of a geographical area comprising capturing images of the geographical area according to an image capture method as defined above, and calculating a three-dimensional map of the geographical area from the captured images.

The invention further relates to a self-piloted aircraft equipped with an image capture apparatus mounted movably on the aircraft around a rotation axis, the aircraft being configured to implement a method for capturing aerial images as defined above.

BRIEF DESCRIPTION OF THE DRAWINGS

The invention and its advantages will be better understood upon reading the following description, provided solely as a non-limiting example, and done in reference to the appended drawings, in which.

DETAILED DESCRIPTION OF PREFERRED EMBODIMENTS

Figure 1:
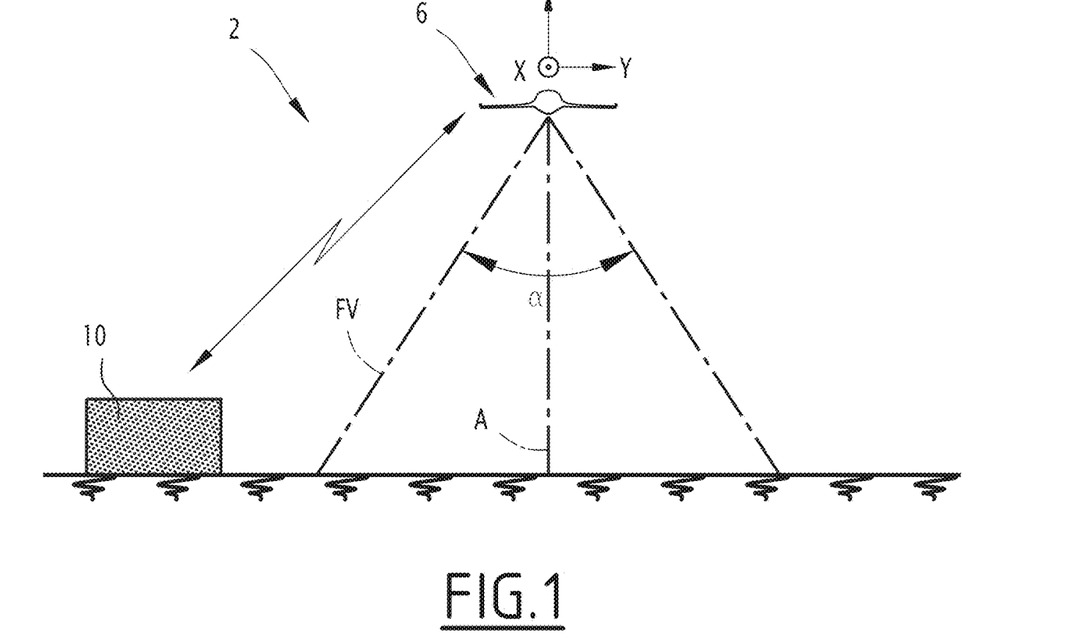
FIG. 1 is a schematic view of an assembly for capturing aerial images of a geographical area comprising an aircraft equipped with an image capture apparatus.
Figure 2:
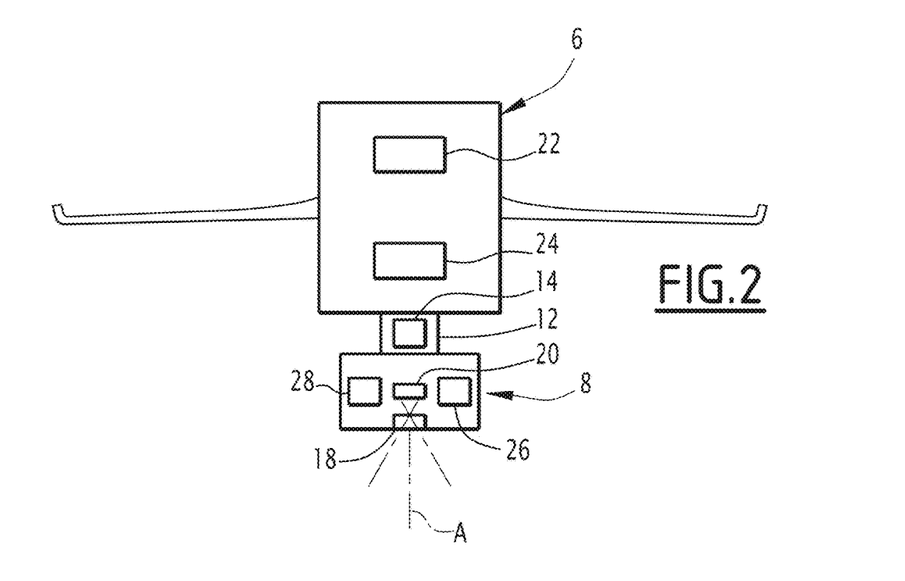
FIG. 2 is a schematic view of the aircraft equipped with an image capture apparatus.
Figure 3:
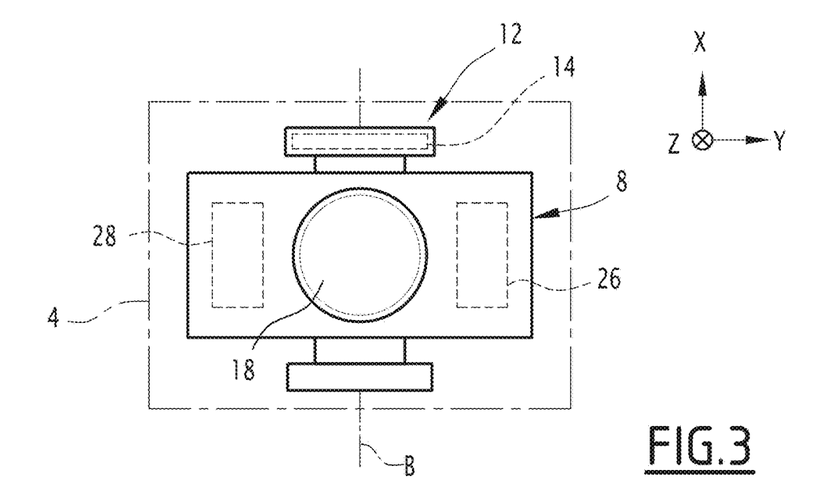
FIG. 3 is a partial schematic bottom view of the aircraft showing the image capture apparatus on board the aircraft.

The assembly 2 shown in FIGS. 1 to 3 comprises an aircraft 6 equipped with an image capture apparatus 8 (FIGS. 2 and 3) mounted on the aircraft 6 for acquiring aerial images of a geographical zone when the aircraft 6 is in flight.

The aircraft 6 is for example a fixed-wing aircraft.

The aircraft 6 is self-piloted. "Self-piloted" means that the aircraft 6 is configured to fly autonomously by following a determined flight plan, in particular without intervention by a human pilot to follow the flight plan.

Preferably, the aircraft 6 has no human presence on board, in particular no human pilot on board. Such an aircraft is generally referred to as "drone", or using the acronym UAV for "Unmanned Aerial Vehicle".

In the remainder of the description, the terms "vertical", "horizontal", "top", "bottom", "right" and "left" are to be understood relative to the usual orthogonal coordinate system of the aircraft 6, the orthogonal coordinate system having, when the aircraft 6 flies horizontally in a straight line, a roll axis X oriented horizontally from back to front, a pitch axis Y oriented horizontally from right to left and a yaw axis oriented from bottom to top.

In one exemplary embodiment, the assembly 2 comprises a control station 10 to control the aircraft 6 remotely. The control station 10 is for example located on the ground. In a manner known in itself, the aircraft 6 and the control station 10 are configured to communicate remotely with one another, for example by radio waves.

The control station 10 for example allows remote control of the operation of the aircraft 6, control of the tracking of the flight plan by the aircraft 6, sending of a flight plan update of the aircraft 6 during the flight and/or recovery of images collected by the image capture apparatus 8 mounted on the aircraft 6 during the flight.

The image capture apparatus 8 has a sighting axis or optical axis A. The optical axis A of the image capture apparatus 8 is the axis along which the image capture apparatus 8 captures images.

The image capture apparatus 8 is mounted on the aircraft 6 such that the optical axis A has a vertical component and is oriented downward when the aircraft 6 flies horizontally and in a straight line. Thus, the image capture apparatus 8 is able to capture aerial images of the geographical area flown over by the aircraft 6.

The image capture apparatus 8 is mounted rotatably relative to the aircraft 6 around a rotation axis B. This makes it possible to modify the angular position or the orientation of the image capture apparatus 8 relative to the aircraft 6, in order to capture images in different directions from the aircraft 6.

Preferably, the rotation axis B is contained in a plane defined by the yaw axis Z and the roll axis X, the rotation axis B defining, with the roll axis, an angle smaller than 15°, in particular smaller than 10°. In one exemplary embodiment, the roll axis X and the rotation axis B are parallel, in particular combined.

In one exemplary embodiment, the rotation axis B is substantially perpendicular to the optical axis A of the image capture apparatus 8.

In a central position of the image capture apparatus 8, the optical axis A is contained in the plane defined by the yaw axis Z and the roll axis X. Thus, the image capture apparatus 8 can take an image substantially under the aircraft 6, the optical axis A being close to the vertical. When the optical axis A is vertical, the centered position corresponds to a nadir orientation.

When the image capture apparatus 8 is pivoted around the rotation axis B relative to the centered position, the image capture apparatus 8 can capture an aerial image of a region on the side of the aircraft 6, to the right or left of the aircraft 6. The image capture apparatus 8 is then in a so-called "oblique" position or an oblique orientation.

In one exemplary embodiment, the angular rotation amplitude of the image capture apparatus 8 relative to the aircraft 6 around the rotation axis B is +/−45° around the centered position.

The field of view FV of the image capture apparatus 8 in particular depends on the opening angle α of the image capture apparatus 8.

The opening angle α of the image capture apparatus 8 is preferably greater than or equal to the angular rotation amplitude of the image capture apparatus 8 around the rotation axis B.

Thus, an image captured with the image capture apparatus 8 oriented with its oblique optical axis A will have an overlap with an image captured with the image capture apparatus 8 in the neutral position, over the entire angular rotation amplitude of the image capture apparatus 8.

As illustrated in FIGS. 2 and 3, the image capture apparatus 8 is mounted on the aircraft 6 by means of a mounting device 12 allowing the rotation of the image capture apparatus 8 relative to the aircraft 6 around the rotation axis B and comprising at least one actuator 14, for example an electric motor, to rotate the image capture apparatus 8 around the rotation axis B relative to the aircraft 6.

The image capture apparatus 8 has an optical lens 18 and a photosensitive sensor 20 to capture images. The photosensitive sensor 20 is for example a matrix sensor. The image capture apparatus 8 has an optical center O.

The aircraft 6 comprises an automatic pilot 22 configured to pilot the aircraft 6 autonomously. The automatic pilot 22 is in particular configured to command the control surfaces of the aircraft 6 and/or a propulsion system of the aircraft 6, in particular based on a flight plan to be followed in order to capture aerial images of a geographical area.

Advantageously, the aircraft 6 is provided with a geolocation receiver 24 configured to determine the geographical position of the aircraft 6 based on geolocation signals emitted by satellites of a satellite geolocation system, for example the GPS, GALILEO or GLONASS geolocation.

Preferably, the automatic pilot 22 is configured to pilot the aircraft 6 automatically based on geolocation data of the aircraft 6 provided by the geolocation receiver 24 and a determined flight plan.

In one exemplary embodiment, the aircraft 6 equipped with the image capture apparatus 8 comprises a command module 26 configured to trigger the capture of images by the image capture apparatus 8 and to command the angular position of the image capture apparatus 8 relative to the aircraft 6. To command the angular position, the command module 26 here is configured to command the or each actuator 14.

The command module 26 is for example integrated into the image capture apparatus 8.

Advantageously, the aircraft 6 equipped with the image capture apparatus 8 is configured to measure the absolute orientation of the image capture apparatus 8, i.e., its orientation in the earth's coordinate system.

In one exemplary embodiment, the image capture apparatus 8 is equipped with an inertial measurement unit 28 (IMU). The inertial measurement unit 28 arranged on the image capture apparatus 8 is able to provide measurements representative of the absolute orientation of the image capture apparatus 8, irrespective of the relative position of the image capture apparatus 8 and the aircraft 6.

Preferably, the aircraft 6 equipped with the image capture apparatus 8 is configured to associate, with each captured image, absolute orientation data of the image capture apparatus 8 at the capture moment of this captured image and/or to associate, with each captured image, geolocation data of the image capture apparatus 8. These orientation and geolocation data are useful for a three-dimensional reconstruction of the geographical area from the captured images.

The aircraft 6 equipped with the image capture apparatus 8 is for example configured to calculate the geolocation data of the image capture apparatus 8 from the geographical position of the aircraft 6 determined by the geolocation receiver 24.

Advantageously, the geolocation data of the image capture apparatus 8 associated with each captured image are relative to the geographical position of the optical center O of the image capture apparatus 8. This allows a precise three-dimensional map.

Preferably, the position of the optical center O of the image capture apparatus 8 is fixed relative to the aircraft 6 when the image capture apparatus 8 is pivoted around the rotation axis B relative to the aircraft 6. To that end, the optical center O is for example located on the rotation axis B.

The aircraft 6 equipped with the image capture apparatus 8 is configured to capture images based on the flight plan followed by the aircraft 6 and image capture instructions defining the angular position of the image capture apparatus 8.

The aircraft 6 equipped with the image capture apparatus 8 is configured to allow, during the flyover of the geographical area, a variation of the angular position(s) adopted by the image capture apparatus 8 for the image captures, in a predetermined manner before flying over the geographical area or in a manner determined while flying over the geographical area, such that images are taken by positioning the image capture apparatus 8 relative to the aircraft 6 in a certain manner in part of the flight plan, and such that images are taken by positioning the image capture apparatus 8 relative to the aircraft 6 in another manner in another part of the flight plan.

In particular, the aircraft 6 equipped with the image capture apparatus 8 is configured in order, successively while flying over the geographical area, to:

capture a first series of images by positioning the image capture apparatus iteratively according to a first sequence of angular position(s) including a first angular position or at least two distinct angular positions, a respective image being captured for each angular position of the first sequence upon each iteration of the sequence; then capture a second series of images by positioning the image capture apparatus iteratively according to a second sequence of angular position(s) including a first angular position or at least two distinct angular positions, a respective image being captured for each angular position of the second sequence upon each iteration of the sequence, the second sequence including at least one angular position distinct from each angular position of the first sequence.

"Iteratively" means that a sequence is repeated several times in a row during the capture of a corresponding series of images.

Thus, the first sequence is repeated several times during the capture of the first series of images, before going to the second sequence, which is repeated several times during the capture of the second series of images.

The iteration of a sequence of angular position(s) comprising a single angular position amounts to taking all of the images from the series of images with the same angular position from the image capture apparatus 8.

The iteration of a sequence of angular position(s) comprising at least two distinct angular positions amounts to positioning the image capture apparatus successively in each angular position from the sequence of angular positions while capturing an image in each of these angular positions, then repeating this operation several times in a row.

A method for capturing aerial images of a geographical area using an assembly 2 for capturing aerial images will now be described in reference to FIGS. 1 to 3.

In a preparation step, the user defines a flight plan of the aircraft 6 making it possible to fly over the geographical area for which one wishes to obtain aerial images, for example to make a three-dimensional map of the geographical area.

The user also defines a first sequence of angular position(s) in order to capture a first series of images using the image capture apparatus 8 relative to the aircraft 6. The flight plan and the first sequence of angular position(s) are for example sent to the aircraft 6 by means of the control station 10, before takeoff or after takeoff of the aircraft 6.

The flight plan for example comprises a series of straight flight lines with turns to go from one straight flight line to the next. It is in fact difficult to capture images from the fixed-wing aircraft 6 when it turns and it is on a strong incline around its roll axis X.

Next, during the flyover of the geographical area, the aircraft 6 executes the flight plan while the image capture apparatus 8 captures an image for each angular position of the first sequence, and for each iteration of the first sequence.

According to the method for capturing aerial images, during the flyover of the geographical area, the image capture apparatus 8 captures a second series of images by positioning the image capture apparatus iteratively according to a second sequence of angular position(s) including a first angular position or at least two distinct angular positions, a respective image being captured for each angular position of the second sequence upon each iteration of the sequence, the second sequence including at least one angular position distinct from each angular position of the first sequence.

Preferably, the first sequence of angular position(s) is predetermined before the flight, for example based on the observed geographical area, in particular based on the relief of the observed geographical area.

In one exemplary embodiment, the second sequence of angular position(s) is predetermined before the flight. This for example makes it possible to modify the angular position of the image capture apparatus 8 in a manner predetermined before the flight, for example based on the relief of the geographical area known in advance.

Angular positions in which the optical axis A is oblique to take images on the side of the aircraft 6 make it possible to obtain more data on the inclined or vertical walls present on the side of the aircraft 6 than the centered position of the image capture apparatus 8 in which the optical axis A.

In another exemplary embodiment, the second sequence of angular position(s) is determined during the flight. This for example makes it possible to account for captured images from the first series of images to adapt, during the flight, the orientation of the image capture apparatus 8 based on the relief of the geographical area flown over.

The second sequence of angular position(s) is for example communicated to the aircraft 6 equipped with the image capture apparatus 8 during the flight, for example by means of the control station 10.

The images of the first series of images are for example sent to the control station 10 during the flight in order to be inspected by the operator, who can then send the aircraft 6 a second sequence of angular position(s), the aircraft 6 then being configured to capture the images by henceforth positioning the image capture apparatus 8 according to this second sequence of angular position(s).

A sequence of angular position(s) can be made up of a single angular position. In this case, in practice, the image capture apparatus 8 is kept in the same angular position for all of the images of the series of images.

A sequence of angular position(s) can comprise at least two different angular positions. The sequence of angular position(s) can be formed by a series of angular positions that are all different or a series of angular positions including at least one same angular position several times.

If the sequence of angular position(s) comprises exactly two different angular positions S1 and S2, the series of angular positions is for example obtained by repeating the sequence S1, S2, etc. Other sequences can be considered, for example S1, S2, S2, S1.

If the sequence of angular position(s) comprises exactly three different angular positions S1, S2 and S3, the series of angular positions is for example obtained by repeating the sequence S1, S2, S3, etc. Other sequences can be considered, for example S1, S2, S3, S2.

Preferably, when the first sequence of angular position(s) comprises at least two different angular positions, each of these different angular positions is present a single time in the first sequence.

Also preferably, when the second sequence of angular position(s) comprises at least two different angular positions, each of these different angular positions is present a single time in the first sequence.

This makes it possible to limit the number of captured images and therefore the number of images to be processed, while having sufficient data, and in particular sufficient overlaps between the different captured images, in particular in light of the movement of the aircraft between two successive captures.

In one exemplary embodiment, the first series of images and the second series of images are captured during the movement of the aircraft 6 along a same straight flight line. This for example makes it possible to modify the orientation of the image capture apparatus 8 in a planned manner before the flight or during the flight in order to account for a change in the type of relief along the straight flight line or to correct the orientation of the image capture apparatus during the flight.

In one exemplary embodiment, the first series of images and the second series of images are captured during the movement of the aircraft 6 respectively along a first straight flight line and a second straight flight line that are separate. This makes it possible to account for different reliefs below two separate flight lines of the flight plan or to modify the orientation of the image capture apparatus 8 between one flight line of the flight plan and the next.

In one exemplary embodiment, the first sequence of angular position(s) comprises the centered angular position. Optionally or in a variant, the first sequence of angular position(s) comprises at least one oblique angular position.

In one exemplary embodiment, the second sequence of angular position(s) comprises the centered angular position. Optionally or in a variant, the second sequence of angular position(s) comprises at least one oblique angular position.

The angular position(s) of the image capture apparatus 8 chosen for a first series of images and a second series of images can vary based on the applications, which are quite varied.

Figure 4:
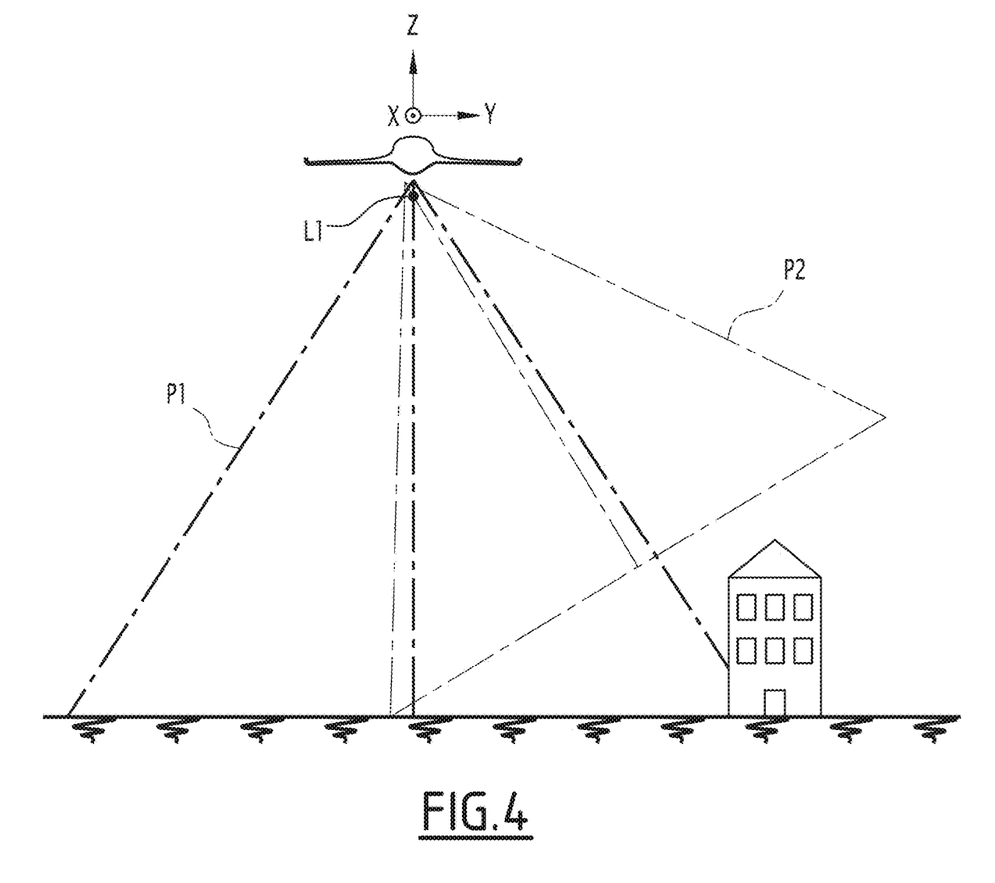
FIGS. 4 to 6 are diagrams illustrating different scenarios for capturing aerial images.
Figure 5:
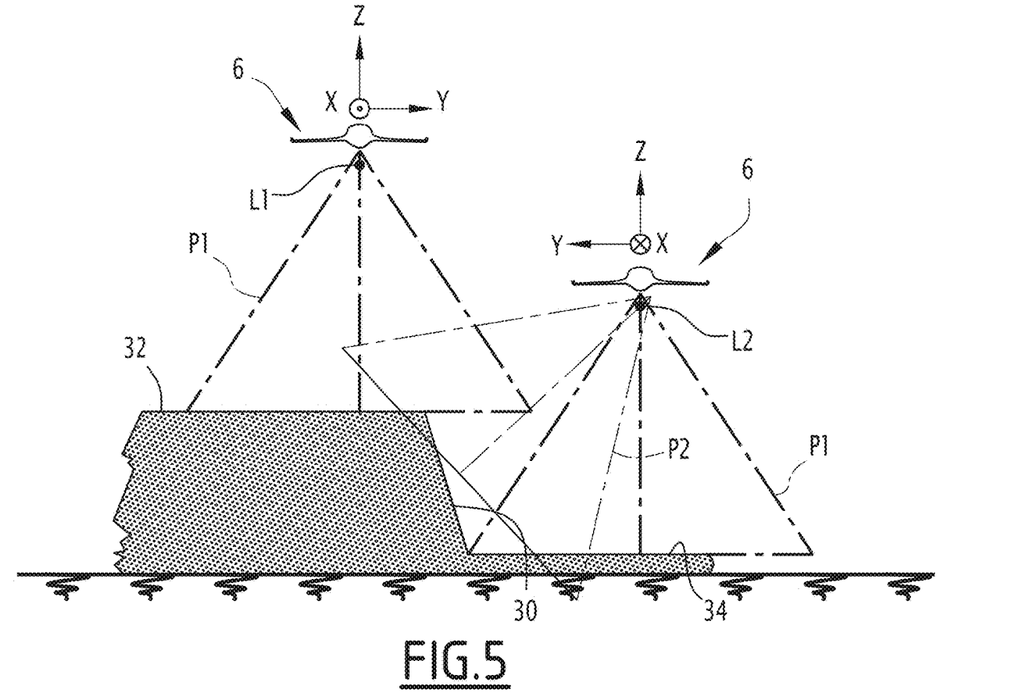
Figure 6:
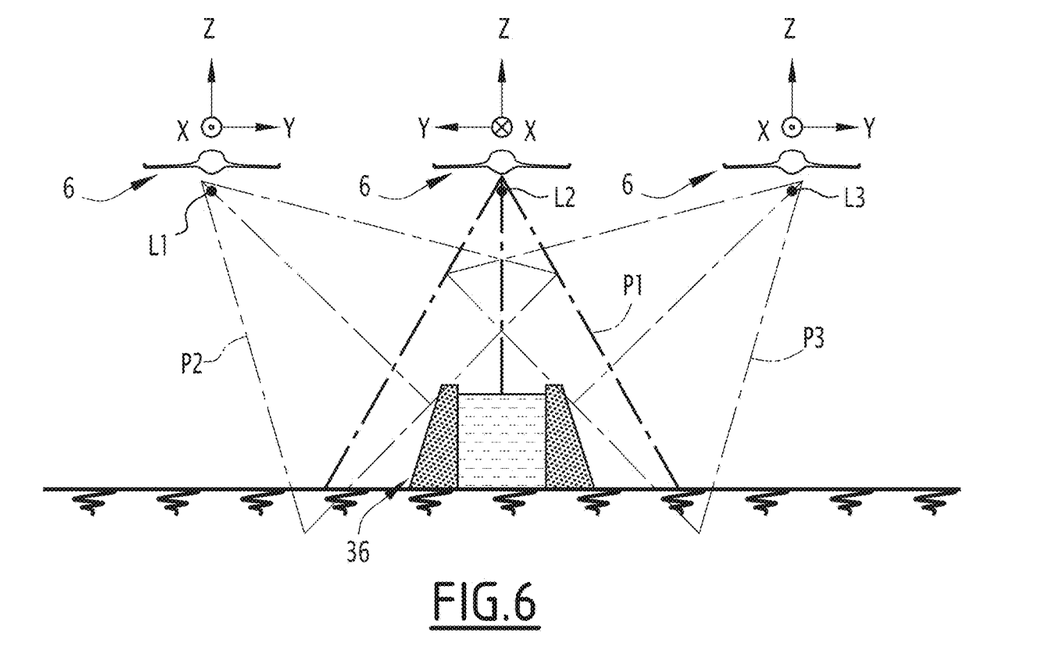

FIGS. 4 to 6 illustrate possible angular positions for certain specific applications, each angular position of the image capture apparatus 8 being symbolized by a graphic element P formed by an isosceles triangle and representing its field of vision FV, and a height of the isosceles triangle representing the optical axis A, an index being added to each reference P to distinguish the different angular positions.

In FIG. 4, the aircraft 6 is shown as moving over a straight flight line, moving toward the viewer. The method for capturing aerial images for example comprises capturing a first series of images with the image capture apparatus 8 positioned along a first sequence of angular position(s) comprising a single angular position, here the centered position P1.

If it appears that inclined surfaces are present on the side of the aircraft 6, here the left side of the aircraft 6, in particular vertical building surfaces, the method for example comprises taking a second series of images by positioning the image capture apparatus 8 according to a second sequence of angular position(s) further comprising a left oblique angular position P2 of the aircraft 6, for example by positioning the image capture apparatus 8 according to the second sequence of angular position(s) P1, P2.

This makes it possible to obtain both images of the geographical area located below the aircraft with a nadir orientation (centered position P1) and images providing data on the inclined surfaces located to the left of the aircraft 6 (left oblique position P2). The passage from the first series of images to the second series of images is planned before the flight or determined during the flight of the aircraft.

In FIG. 5, the aircraft 6 is used to capture aerial images of a geographical area including a cliff or a projection 30 between an upper part 32 and a lower part 34.

The flight plan has a first flight line L1 passing above the lower part in one direction (here toward the viewer) and a second flight line L2 passing above the lower part parallel to the first flight line L1 and in the opposite direction (here away from the viewer).

The method for capturing aerial images for example comprises capturing a first series of images along the first flight line L1 by positioning the image capture device 8 according to a first sequence of angular position(s) comprising a single angular position, namely the centered position P1, and capturing a second series of images along the second flight line L2 by positioning the image capture apparatus 8 according to a sequence of angular positions including two angular positions, namely the centered position P1 and the left oblique angular position P2 making it possible to see the projection 30, for example according to the sequence of angular positions P1, P2.

The second series of images makes it possible to see the lower part 34 and the projection 30 simultaneously during a same passage. The first series of images is taken while keeping the image capture apparatus 8 in the same orientation and limiting the number of images captured and therefore the number of images to be analyzed. An oblique image acquisition along the first flight line L1 would not make it possible to obtain relevant data relative to the projection 30.

In FIG. 6, the aircraft 6 is used to capture images of an elongate protruding part 36 of a geographical area, here a channel.

The flight plan has three straight and parallel flight lines including a first flight line L1 passing laterally from one side of the protruding part 36 in a first direction (here toward the viewer) and a flight line L2 passing above the protruding part 36 and in a direction opposite the first direction (here away from the viewer), and a third flight line L3 passing laterally on the other side of the protruding part 36 and in the first direction (here toward the viewer).

The method for capturing aerial images for example comprises capturing a first series of images along the first flight line by positioning the image capture apparatus 8 according to a first sequence of angular position(s) including a single angular position, namely the left oblique angular position P2, capturing a second series of images along the second flight line by positioning the image capture apparatus 8 according to a second sequence of angular position(s) including a single angular position, here the centered position P1, and capturing a third series of images along the third flight line L3 by positioning the image capture apparatus 8 according to a third sequence of angular position(s) including a single angular position, namely a right oblique angular position P3.

This method makes it possible to capture images of the two side faces and the upper face of the protruding part 36 while obtaining precise data, in particular to produce a three-dimensional map, while limiting the number of captured images to be processed.

In a variant, the first series of images is produced by positioning the image capture apparatus 8 according to a first sequence of angular positions including the centered position and the left oblique position and/or the third series of images is produced by positioning the image capture apparatus 8 according to a third series of angular positions including the centered position and the right oblique position.

This makes it possible to take images of lateral regions 38 adjacent to the protruding part 36 at the same time.

During the capture of the series of images, the method for capturing aerial images comprises measuring the absolute orientation of the image capture apparatus 8 for each captured image, here using an inertial measurement unit 22 mounted on the image capture apparatus 8.

The method also comprises measuring the geographical position of the image capture apparatus for each captured image, using a geolocation receiver.

The geolocation receiver 24 here is carried by the aircraft 6 and supplies the geographical position of the aircraft 6, the geographical position of the image capture apparatus 8 associated with each captured image being calculated from the geographical position of the aircraft 6 and the position of the optical center O of the image capture apparatus 8 relative to the aircraft 6.

The captured images are recorded by associating each captured image with the corresponding angular position of the image capture apparatus 8 and/or the corresponding geographical position of the image capture apparatus 8.

The aerial images of the geographical area are for example used to produce a three-dimensional map of the geographical area, for example by photogrammetry.

Thus, according to a method for three-dimensional mapping of a geographical area comprises capturing images of the geographical area according to a method for capturing aerial images as defined above, and calculating a three-dimensional map of the geographical area from the captured images, for example by photogrammetry.

The capture of series of aerial images during a same flyover of the geographical area by the aircraft 6 transporting the image capture apparatus 8 by using different angular positions of the image capture apparatus 8 from one series of aerial images to the next makes it possible to take images adapted to the reliefs encountered in the geographical area and to obtain data for example allowing satisfactory three-dimensional mapping while limiting the number of images captured and processed.

Limiting the number of images captured makes it possible to save energy during the flight, limit the quantity of images to be remotely transmitted between the aircraft 6 and a control station 6, and limit the resources and/or the processing time of the captured images, for example to calculate a three-dimensional map.

What is claimed is:

1. A method for capturing aerial images of a geographical area using a self-piloted aircraft according to a predetermined flight plan and an image capture apparatus mounted on the aircraft while being movable relative to the aircraft around a rotation axis, the method comprising, during a single flyover of the geographical area by the aircraft:

capturing a first series of images by positioning the image capture apparatus iteratively according to a first sequence of angular position(s) including a first angular position or at least two distinct angular positions, a respective image being captured for each angular position of the first sequence upon each iteration of the sequence; then capturing a second series of images by positioning the image capture apparatus iteratively according to a second sequence of angular position(s) including a first angular position or at least two distinct angular positions, a respective image being captured for each angular position of the second sequence upon each iteration of the sequence, the second sequence including at least one angular position distinct from each angular position of the first sequence, wherein during the capture of images, the image capture apparatus captures a single image for each position of the image capture apparatus, and the image capture apparatus is a single image capture apparatus that captures the single image for each position.

2. The image capture method according to claim 1, wherein the aircraft is a fixed-wing aircraft.

3. The image capture method according to claim 1, wherein the rotation angle is contained in a plane defined by the yaw axis and the roll axis of the aircraft, the rotation angle defining an angle smaller than 15° with the roll axis.

4. The image capture method according to claim 1, wherein the first series of images and the second series of images are captured during the flight of the aircraft along a same straight flight line of the flight plan.

5. The image capture method according to claim 1, wherein the first series of images and the second series of images are captured during the flight of the aircraft along two distinct straight flight lines of the flight plan.

6. The image capture method according to claim 1, wherein the first sequence is predetermined before the flight.

7. The image capture method according to claim 1, wherein the second sequence is predetermined before the flight.

8. The image capture method according to claim 1, wherein the second sequence is determined during the flight.

9. The image capture method according to claim 1, wherein the second sequence is communicated to the aircraft during the flight from a remote command station of the aircraft.

10. The image capture method according to claim 1, wherein the first sequence comprises a centered angular position in which an optical axis of the image capture apparatus is located in the plane defined by the yaw axis and the roll axis and/or at least one oblique angular position in which the optical axis is located in an oblique plane forming a non-nil angle with the plane by the yaw axis and the roll axis, and/or in which the second sequence comprises the centered angular position and/or at least one oblique angular position.

11. The image capture method according to claim 1, wherein the method comprises measuring an absolute orientation of the image capture apparatus for each captured image.

12. The image capture method according to claim 1, wherein the method comprises measuring an absolute orientation of the image capture apparatus for each captured image using an inertial unit mounted on the image capture apparatus.

13. The image capture method according to claim 1, wherein the method comprises measuring a geographical position of the image capture apparatus for each captured image.

14. The image capture method according to claim 1, wherein the method comprises measuring a geographical position of the image capture apparatus for each captured image using a geolocation receiver on board the aircraft.

15. A method for three-dimensional mapping of a geographical area comprising capturing images of the geographical area according to an image capture method according to claim 1, and calculating a three-dimensional map of the geographical area from the captured images.

16. A self-piloted fixed-wing aircraft equipped with an image capture apparatus mounted movably on the aircraft around a rotation axis, the aircraft being configured to implement a method for capturing aerial images according to claim 1.

17. A method for capturing aerial images of a geographical area using a self-piloted aircraft according to a predetermined flight plan and an image capture apparatus mounted on the aircraft while being movable relative to the aircraft around a rotation axis, the method comprising, during a single flyover of the geographical area by the aircraft:

capturing a first series of images by positioning the image capture apparatus at a first angular position, and iteratively capturing images at the first angular position; then capturing a second series of images by positioning the image capture apparatus at a second angular position different from the first position, and iteratively capturing images at the second angular position, wherein during the capture of images, the image capture apparatus captures a single image for each position of the image capture apparatus and the image capture apparatus is a single image capture apparatus that captures the single image for each position.

18. A method for capturing aerial images of a geographical area using a self-piloted aircraft according to a predetermined flight plan and an image capture apparatus mounted on the aircraft while being movable relative to the aircraft around a rotation axis, the method comprising, during a single flyover of the geographical area by the aircraft:

capturing a first series of images by positioning the image capture apparatus iteratively according to a first sequence of angular positions including at least two distinct angular positions, a respective image being captured for each angular position of the first sequence upon each iteration of the sequence; then capturing a second series of images by positioning the image capture apparatus iteratively according to a second sequence of angular positions including at least two distinct angular positions, a respective image being captured for each angular position of the second sequence upon each iteration of the sequence, the second sequence including at least one angular position distinct from each angular position of the first sequence, wherein during the capture of images, the image capture apparatus captures a single image for each position of the image capture apparatus and the image capture apparatus is a single image capture apparatus that captures the single image for each position.

* * * * *